UNITED STATES PATENT OFFICE.

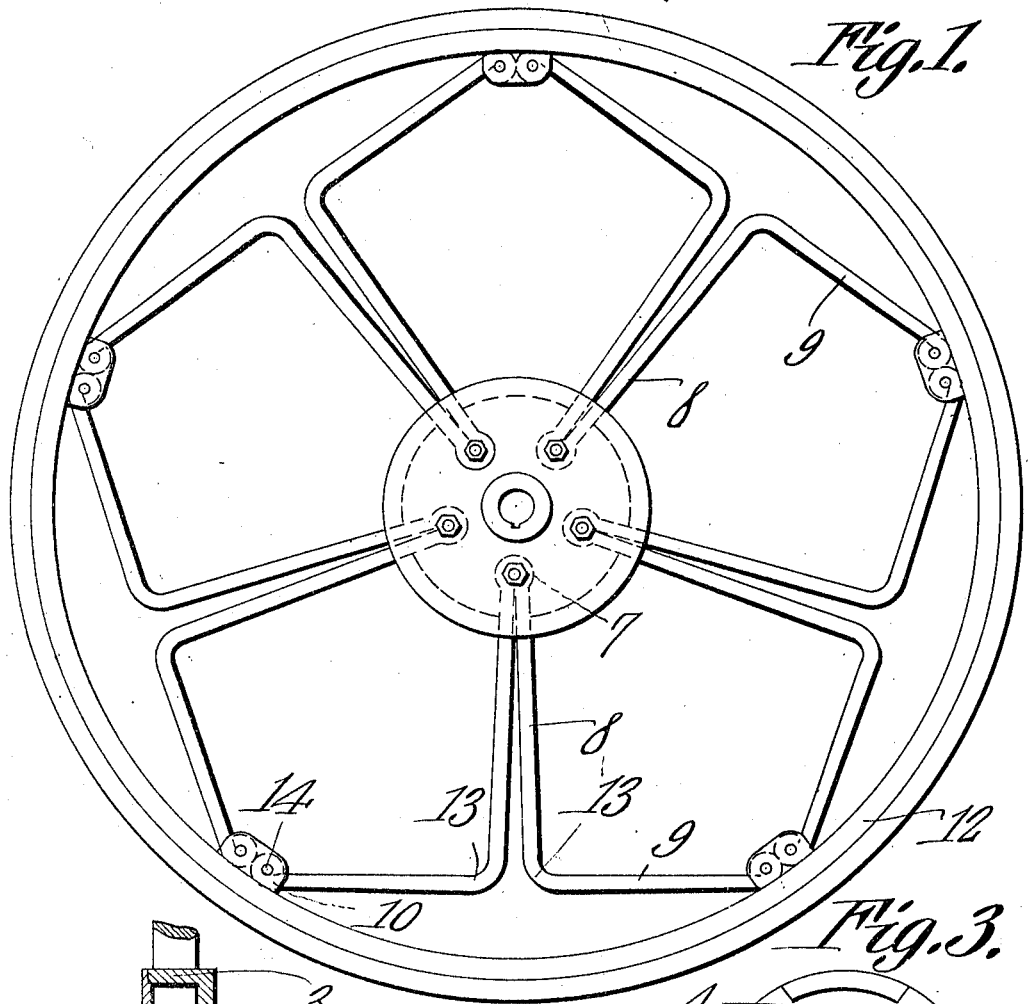

HOLLING G. TUCKER, OF HEREFORD, TEXAS.

VEHICLE-WHEEL.

992,085. Specification of Letters Patent. Patented May 9, 1911.

Application filed December 7, 1909. Serial No. 531,831.

*To all whom it may concern:*

Be it known that I, HOLLING G. TUCKER, a citizen of the United States, residing at Hereford, in the county of Deaf Smith and State of Texas, have invented a new and useful Vehicle-Wheel, of which the following is a specification.

This invention relates to vehicle wheels of that type particularly designed for use in connection with automobiles.

One of the objects of the invention is to provide an express wheel the parts of which are so constructed and assembled as to prevent the rim from moving out of line with the hub without, however, rendering the device bulky or unattractive.

A further object is to provide a wheel which is simple in construction, which is sufficiently resilient to render it an efficient substitute for a wheel equipped with a pneumatic tire, and which has springs so shaped as to prevent them from snapping off when subjected to sudden jolts.

With these and other objects in view the invention consists of certain novel details of construction and combinations of parts hereinafter more fully described and pointed out in the claim.

In the accompanying drawings the preferred form of the invention has been shown.

In said drawings, Figure 1 is a side elevation of the wheel. Fig. 2 is a transverse section through the hub thereof and showing the adjoining portions of the spring strips. Fig. 3 is a side elevation of the hub with the base plate removed. Fig. 4 is an elevation of a portion of the rim showing the ears thereon.

Referring to the figures by characters of reference 1 designates a sleeve constituting the middle portion of the hub of the wheel, this sleeve being provided with an annular flange 2 from the periphery of which extends a lateral rim 3 provided at regular intervals with slots 4. A face plate 5 is designed to be clamped upon the rim 3, the bolts 6 used for this purpose being extended through the flange 2 and the face plate 5 at points between the slots 4 and the center of the hub. These bolts constitute means for attaching the springs of the wheel to the hub, said springs being each formed with a central eye 7 through which a bolt 6 extends and there being outwardly diverging arms 8 extending from each eye and merging into oppositely extending alining terminal portions 9. An eye 10 is formed at the free end of each of these terminal portions and is seated between a pair of ears 11 formed upon the inner face of the wheel rim 12, there being pivot bolts 14 or the like extending transversely within the ears 11 and constituting means for securing the eyes 10 in place. It is to be understood of course that the diverging arms 8 of each spring are arranged within one of the slots 4.

As shown especially in Fig. 2, each spring is of flat metal and by reason of the peculiar connections between the middle and end portions of each spring and the hub and rim it will be seen that the rim will be held under all conditions in line with the hub. When the wheel is subjected to a load the springs will all be shifted out of their normal positions, those portions thereof at the sides of the line of pressure being bowed while the springs in line with the pressure will be shifted downwardly in the direction of the rim, the diverging arms 8 thereof spreading apart to a slight extent during this movement. Should the wheel be subjected to an unusually severe jolt, the angle portions 13 of the lowermost spring or springs will be brought into contact with the rim and rupturing of the spring will thus be prevented.

It will be seen that the wheel is very simple in construction, that the parts can be readily assembled, and that the springs not only serve to render the wheel sufficiently elastic, but also hold the rim and hub in line under all conditions.

Various changes can of course be made in the construction and arrangement of the parts without departing from the spirit or sacrificing any of the advantages of the invention.

What is claimed is:

A spring wheel including a rim, spring spokes each having an intermediate eye, all of said springs being arranged in the same plane, arms diverging from the eye, and oppositely extending normally alining terminal portions pivotally connected to the rim, the terminal portions of adjacent spokes converging toward the rim, and a hub including a sleeve, an annular flange thereon, a rim upon one face of the flange and having recesses for the reception of the arms of the spokes, those portions of the flange between the recesses constituting means for spacing and bracing the spokes, a face plate bearing upon the rim, and fastening devices extending through the face plate and flange and through the eyes, said devices constituting
5 means for holding the parts of the hubs together and for securing the spokes within the hub.

In testimony that I claim the foregoing as my own, I have hereto affixed my signature in the presence of two witnesses.

HOLLING G. TUCKER.

Witnesses:
 ARETAS KANE,
 E. RENFRO.

Copies of this patent may be obtained for five cents each, by addressing the "Commissioner of Patents, Washington, D. C."